(12) United States Patent
Parent et al.

(10) Patent No.: US 7,721,400 B2
(45) Date of Patent: May 25, 2010

(54) SPIKED PLATE

(75) Inventors: Stephen E. Parent, Louisville, KY (US); Daniel L. Day, Louisville, KY (US)

(73) Assignee: Ellis ENZ Splits, LLC, Lima, OH (US)

( * ) Notice: Subject to any disclaimer, the term of this patent is extended or adjusted under 35 U.S.C. 154(b) by 1205 days.

(21) Appl. No.: 10/517,961

(22) PCT Filed: Jun. 16, 2003

(86) PCT No.: PCT/US03/18806

§ 371 (c)(1),
(2), (4) Date: Aug. 31, 2005

(87) PCT Pub. No.: WO03/106103

PCT Pub. Date: Dec. 24, 2003

(65) Prior Publication Data

US 2006/0010678 A1 Jan. 19, 2006

Related U.S. Application Data

(60) Provisional application No. 60/388,778, filed on Jun. 14, 2002.

(51) Int. Cl.
   *B23P 6/00* (2006.01)
   *B23P 11/00* (2006.01)
   *B23P 19/02* (2006.01)
   *B27M 3/00* (2006.01)
   *F16B 15/00* (2006.01)

(52) U.S. Cl. ............... 29/402.09; 29/402.14; 29/432; 29/525; 29/525.01; 144/330; 411/457; 411/459; 411/461; 411/463; 411/466

(58) Field of Classification Search ........... 29/402.09, 29/402.14, 432, 525, 525.01; 7/166; 144/330; 411/457, 459, 461, 463, 466
See application file for complete search history.

(56) References Cited

U.S. PATENT DOCUMENTS 792,719 A   6/1905   Molkenthin (Continued)

FOREIGN PATENT DOCUMENTS

DE   26 22 931   12/1976

(Continued)

OTHER PUBLICATIONS

Co-Pending U.S. Appl. No. 12/086,071, filed Sep. 5, 2008; inventor Mario Zöllig; title Rotor for an Impact Crusher.

*Primary Examiner*—David P Bryant
*Assistant Examiner*—Alexander P Taousakis
(74) *Attorney, Agent, or Firm*—Carrithers Law Office, PLLC; David W. Carrithers

(57) ABSTRACT

A plate (10) with spikes (11) projecting therefrom to impale a log on respective opposite sides of a crack (20) in the end of the log and wherein the plate has pull tabs (18, 19) integral therewith and grippingly engageable by a tool (30) used to remove the plate from the end of the log. A tool for inserting and removing the plate from the log includes means (37) for driving and means (33) for removing the plate from the log including a slot (35) adjacent the impact end of the tool and into which the pull tab on the plate is inserted.

24 Claims, 8 Drawing Sheets

U.S. PATENT DOCUMENTS

| | | | |
|---|---|---|---|
| 868,733 A | 10/1907 | Walker | |
| 1,182,348 A | 5/1916 | Charley | |
| 1,290,431 A | 1/1919 | Waite | |
| D54,825 S | 4/1920 | Barnes | |
| 1,425,199 A * | 8/1922 | Hartley | 411/457 |
| 1,593,408 A * | 7/1926 | Honigbaum | 52/548 |
| 1,810,597 A * | 6/1931 | Corwin | 52/489.2 |
| 1,925,238 A | 9/1933 | Faries et al. | |
| 2,120,049 A | 6/1938 | Winship | |
| 2,383,135 A | 8/1945 | Lang | |
| 2,709,048 A | 5/1955 | Stark | |
| 2,711,109 A | 6/1955 | Gillstrom | |
| 2,754,516 A | 7/1956 | Gasstrom | |
| D185,948 S | 8/1959 | Schmidt | |
| 3,883,080 A | 5/1975 | Andersson | |
| 4,343,580 A | 8/1982 | Moyer et al. | |
| 4,378,911 A | 4/1983 | Adams et al. | |
| D301,679 S | 6/1989 | Kokkinos | |
| 4,887,952 A | 12/1989 | Wolf | |
| 5,116,179 A | 5/1992 | Matlock | |
| 5,244,328 A | 9/1993 | Higgins | |
| 5,255,575 A | 10/1993 | Williams | |
| D353,758 S | 12/1994 | Frykman | |
| 5,410,854 A | 5/1995 | Kimmell et al. | |
| 5,435,111 A * | 7/1995 | Cox et al. | 52/713 |
| 5,459,917 A | 10/1995 | Smith | |
| 5,632,128 A | 5/1997 | Agar | |
| D386,380 S | 11/1997 | Villarreal | |
| D388,303 S | 12/1997 | Berggren | |
| 5,833,421 A | 11/1998 | Lees et al. | |
| D420,268 S | 2/2000 | Coonrad | |
| 6,021,966 A | 2/2000 | Doenges et al. | |
| 6,286,570 B1 | 9/2001 | Murray et al. | |

FOREIGN PATENT DOCUMENTS

| | | |
|---|---|---|
| DE | 30 17 437 A1 | 11/1981 |
| DE | 41 28 225 A1 | 3/1993 |
| DE | 298 22 550 U1 | 2/1999 |
| DE | 299 04 006 U1 | 6/1999 |
| DE | 100 47 095 A1 | 4/2002 |
| GB | 356873 | 9/1931 |
| GB | 1 397 674 | 6/1975 |
| WO | WO 90/07981 | 7/1990 |
| WO | WO 00/53324 | 9/2000 |

* cited by examiner

SPIKED PLATE

This application claims priority from U.S. Provisional Application Ser. No. 60/388,778 filed on Jun. 14, 2002 the entirety of which is incorporated herein.

FIELD OF INVENTION

This invention relates generally to the logging industry and more particularly to improvements in arresting splits that occur in logs as they dry, and to a plate having spikes integral therewith that project therefrom for impaling the end of a log on opposite sides of one or more gaps in the end of the log as a result of one or more splits in that log and wherein the plate has a tab, or tabs, integral therewith or other opening formed therein for insertion of a tool for gripping and removal of the plate from the log and to a hand tool for removing the plate from the log.

BACKGROUND OF INVENTION

Logs split as they are drying after having been felled in the forest and a split shows as a crack in the end of the log. These splits, particularly in hardwoods, can result in substantial loss of lumber that otherwise would be obtainable from the log in that the portion of the log containing splits is cut from the log during the milling process because it can not be used as prime lumber or veneer. In the past metal "S" shaped clips, referred to also as hooks, have been driven edgewise into the end of a log at a position transverse to the crack, or cracks as the case maybe, to prevent the gap of the crack from increasing in size and thereby prevent the split from traveling further along the log. While the "S" clips arrest the splitting they must be removed before the log is cut into pieces of lumber or timber at the saw mill or the end of the log is sawed off wasting same. The "S" clips are difficult to grip with a tool and time consuming to remove. Often workers just leave the very difficult ones in the log and this can cause not only severe damage to the saw blades but also endangers the well being of any nearby mill workers. The metal "S" clips were really made for the ends of railway ties where they were intended to stay for the life of the tie.

More recently the U.C. Coatings Corporation of Buffalo N.Y. have made available, under the Trademark "HR-Logsavers", an 'I' shaped device that can be driven into the end of a log like the "S" clips but instead of metal it is made of a plastics material. The literature indicates that "since they can be sawn through, they eliminate potential damage to saws and the danger of machine operators from flying material." These 'I' shaped clips however, like the 'S' clips, must be driven edgewise into the end of the log and even with a sharpened edge this can be difficult particularly with hard woods. Moreover, they are difficult to grip and remove with a tool and may break during the extraction process.

In the construction industry it is known to utilize spiked plates, like connector plates for joining together components and by way of example such connector plates are conventionally found in roof trusses. The connectors are stamped metal plates and have a plurality of spikes projecting from one face thereof for impaling the lumber pieces. The spikes may be variously shaped and/or barbed to improve the holding power and/or drawing together adjacently disposed pieces as the spikes are driven into the lumber. Typically the spikes are formed by utilizing a plurality of angled punches to stamp thorough the metal plate forming triangular shaped projections on one side of the plate which can be pressed into the junction of two or more pieces of lumber. By way of example, connector plates with various features are disclosed in the following United States patents: U.S. Pat. No. 5,833,421 granted Nov. 10, 1998 to William F. Lees et al; U.S. Pat. No. 5,632,128 granted May 27, 1997 to Robert S. Agar; U.S. Pat. No. 5,410,854 granted May 2, 1995 to Bruce A. Kimmell et al.; U.S. Pat. No. 4,887,952 granted Dec. 19, 1989 to Johann Wolf; and U.S. Pat. No. 4,343,580 granted Aug. 10, 1982 to Anthony M. Moyer et al. Moreover, a nail end plate for wooden ties is disclosed in U.S. Pat. No. 5,116,179 granted May 26, 1992 to Gordon E. Matlock None of these known connector plates and the known log end plates do not incorporate any feature, or features, that facilitate their removal from their place of use.

There are variously shaped hammer heads for attaching and removing fasteners and the following United States Design patents are examples of a few: U.S. Pat. No. 420,268 granted Feb. 8, 2000 to T. Coonrad; U.S. Pat. No. 388,303 granted Dec. 30, 1997 to M. Berggren; U.S. Pat. No. 386,380 granted Nov. 18, 1997 to D. Villarreal; U.S. Pat. No. 353,758 granted Dec. 27, 1994 to J. Frykman; and U.S. Pat. No. 54,285 granted Apr. 18, 1920 to J. Barns. None of the foregoing tools are adapted for removing a spiked plate from its place of use.

SUMMARY OF INVENTION

The present invention provides for a method of arresting continuation of a split in a log wherein the split appears as a crack in an end face of such log. A plate having spaced apart spikes projecting from one face thereof and at least one plate pull tab, each the pull tab being of selected length, integral with the plate and operably engagable by a tool disposed adjacent a face of the plate opposite the one face, is positioned to span across the gap of the crack and driving the spikes of the plate into the end of the log at locations on each of opposite sides of the crack. In a preferred embodiment the at least one pull tab is formed by stamping through a portion of the plate forming a distal end and side edges whereby the projecting distal end bent downward forming spikes which are driven into the log at an angle which tends to lock into the wood whereby the tendency of the wood to split results in a tight grip of the wood by the pull tab. Moreover, the openings formed in the top of the plates upon insertion of the pull tab in the wood provide a entry point for cooperative engagement with a pry member of a removal tool.

The plate may have a pair of oppositely disposed faces, a plurality of spaced apart spikes projecting from one of the pair of faces and at least one plate pull tab integral with the plate and of selected length, each the pull tab being exposed for locking engagement with a tool disposed adjacent the face of the plate opposite the one face.

The spiked plate may also include means on each the plate pull tab that projects therefrom in a direction corresponding to that of the spikes and thereby spacing the respective pull tabs a selected distance from the surface of an object impaled by the spikes.

The spiked plate of the instant invention may be inserted and removed by a device for extracting the spikes of a spiked plate from wood prior to processing the log. The tool comprises a tool head securable to one end of an elongate handle, the tool head having first and second respective opposite terminal ends, an outer face disposed between the first and second terminal ends and having at least a portion thereof curved for rolling engagement with an outer exposed surface of the plate. The tool includes a slot in the too head and a mouth entry into the slot located at a position adjacent the second terminal end of the head for insertion into the opening formed in the top of the spiked plate by angling of the pull tabs downward. A preferred embodiment may include a hammer head or even more preferably a hatchet head on one end opposite the means for driving the spikes plates into a log.

The hand tool for removing a spiked plate from the end of a log may comprise an alternate embodiment comprising a handle having a tool head mounted on the free outer end thereof, the tool head comprising first and second respective opposite terminal ends, a curved outer face located between the first and second terminal ends, a slot in the head and a mouth entry into the slot located at a position adjacent the second terminal end of the head.

An object of the present invention is to provide a connector type plate with means to facilitate removal of the same by a tool that engages and cooperates with such means.

A further object of the present invention is to provide a spiked log end plate and such a plate with a tab that is engageable by a tool used to remove the plate from an in-situ use of the plate.

A further principal object of the present invention is to provide a hand tool for removing spike type connector plates and log end plates from their in-situ use.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF PREFERRED EMBODIMENTS

Figure 1:
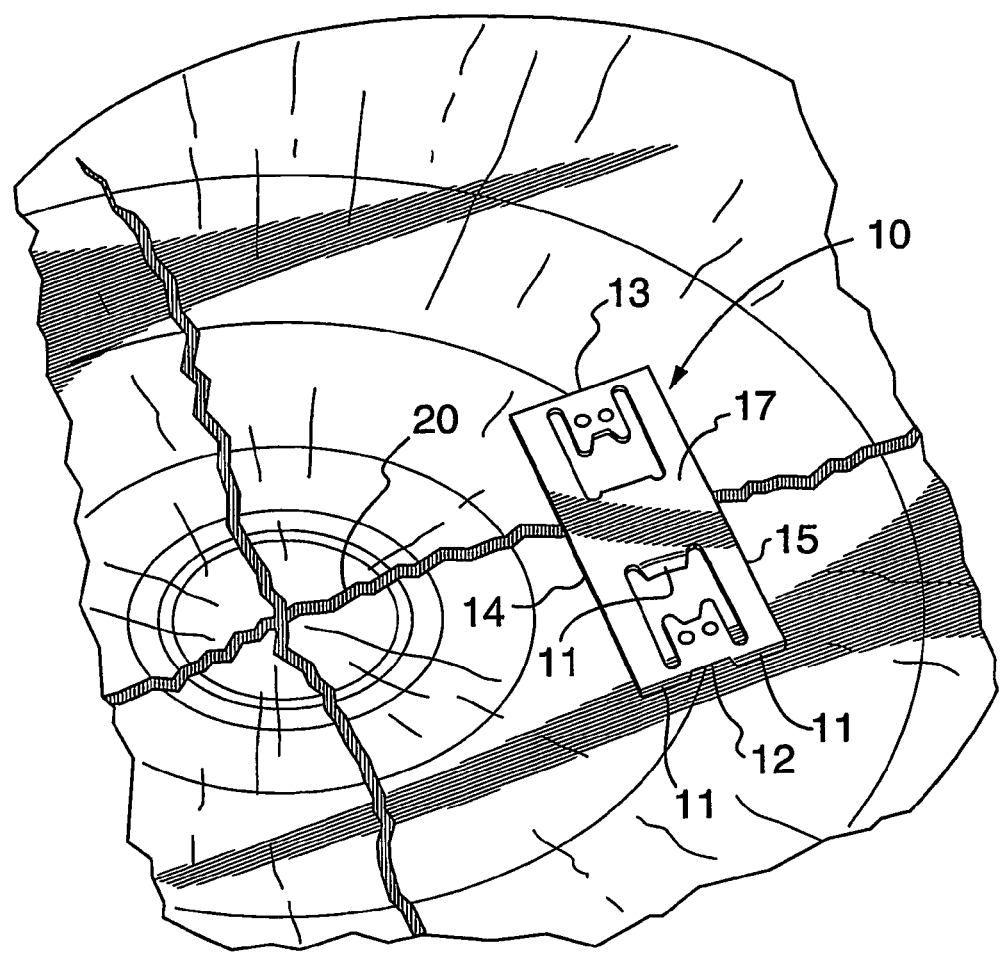
FIG. 1 is an oblique view showing a portion of the end of a log with a log end plate of the present invention spanning the gap of a crack in the end of the log and with the spikes of the plate impaled in the log on respective opposite sides of the crack.

Illustrated in the drawings are log end plates (log staples) that have spikes integral therewith for impaling the end of a log. The end plates have a pair of pull tabs, in accordance with one aspect of the present invention, that are engageable by a tool provided in accordance with another aspect of the present invention used to remove the plate from the log. Normally the end plate is made of heavier material and preferably the pull tabs have means thereon that space them a selected amount from the adjacent end face of the log.

A hand tool, similar to a claw hammer but differing therefrom by having a slot in one end of the head and single wedge on the opposing end is used to drive the spikes of the plate into the log and also remove the end plate from a log. The head of the tool has an outer face opposite the handle with at least a portion of which is curved for rolling contact with the plate during pulling of the spikes from the wood. The head impact portion of the tool has a slot adjacent an impact face portion thereof into which a pull tab can be inserted. As the tool handle is moved the outer face rolls over the outer face of the log end plate. The pull tab bends and thereby becomes self-locking onto the tool.

Figure 2:
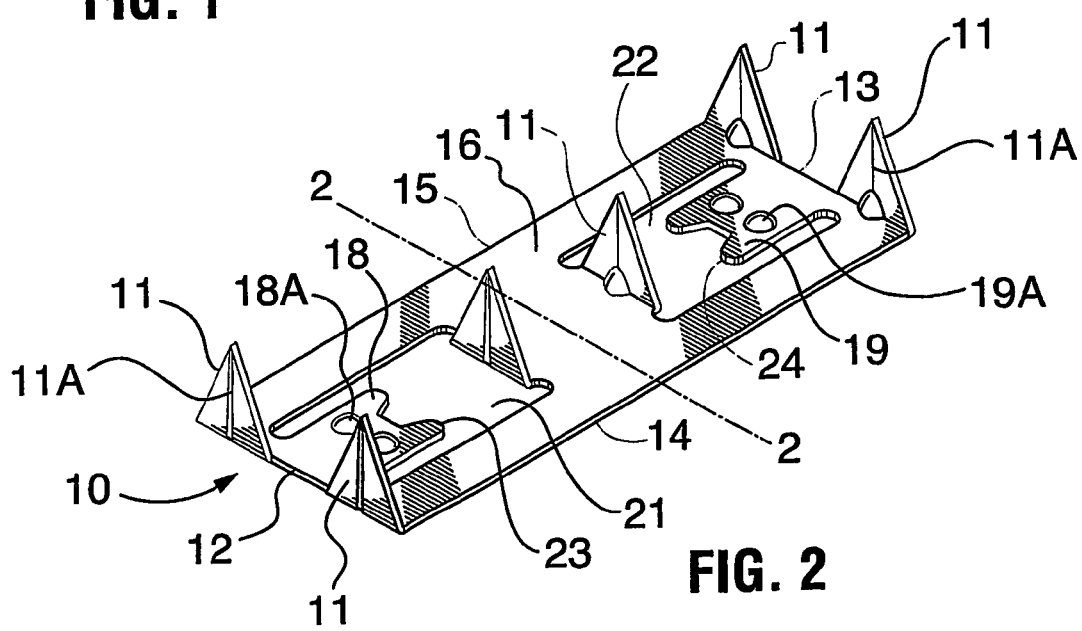
FIG. 2 is an oblique view of the log end plate of FIG. 1 showing it from the opposite side and not mounted on the log.
Figure 2A:
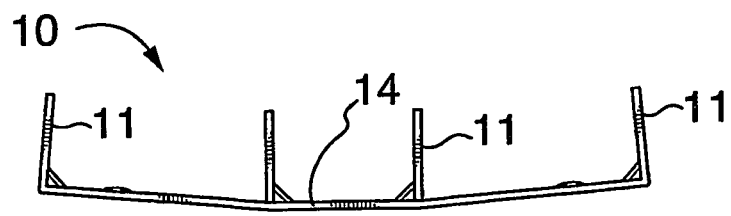
FIG. 2a is side elevational view of the end plate shown in FIG. 2.

Referring now specifically to FIGS. 1 and 2, there is illustrated a log end plate 10, of the present invention, spanning across a crack 20 in the end 21 of a log such crack being the end of a split in the log. The log end plate 10 has a pair of oppositely disposed ends designated respectively 12 and 13, a pair of longitudinal marginal edges 14 and 15 and a pair of oppositely disposed faces 16 and 17. A plurality of spikes 11, integral with the plate, project outwardly from the face 16 and impale the end of the log on each of respective opposite sides of the crack 20. The plate spans across the crack and prevents enlargement of the same thereby restraining the split from progressing further along the log.

The spikes are preferably stiffened by suitable means such as for example at least one rib 11A. The rib may extend the entire length of, or a portion of the length that extends from adjacent the plate face 16 to near the tip of the spike. Alternatively the spikes maybe bent so as to be generally 'V' shape in cross-section. The ribs, or the apex of the 'V' as the case maybe, project in a direction toward (or away as maybe desired) the plate's axis of symmetry disposed transverse to the length of the plate and shown in FIG. 2 as a broken line designated 2-2. The spikes on each of the respective opposite sides of this axis of symmetry slope upwardly away from the plate face 16 in a direction away from the axis of symmetry and as they are driven into the end of the log a force is applied having a tendency to close the gap of the crack. The plate is a generally flat planar element with the spikes projecting therefrom If desired however the plate can be curved somewhat so as to be slightly concave or slightly convex depending upon the holding characteristics desired. Also the log end plates can be suitably shaped and/or provided with longitudinal concave and/or convex formations to reinforce the plate in various areas as maybe desired. Moreover, the plate may have a generally flat longitudinal center portion with a slight downward bend near each end of the plate resulting in the last ⅕ to ⅓ of the plate being angled inwardly. Moreover, the bend in the plate may correspond to the point which forms the base of the pull tab.

A preferred embodiment of the log end plates, in accordance with the present invention, have a spaced apart pair of opposing pull tabs. In the embodiment illustrated in FIGS. 1 to 6 the pull tabs, designated respectively 18 and 19, are located in respective open windows 21,22 in the plate. The pull tabs extend in a direction toward one another terminating in respective free outer terminal ends 23, 24. In the embodiment of the plate illustrated in FIGS. 7 to 9 there are pull tabs 25, 26 located at respective opposite ends of the plate. In this embodiment the pull tabs extend in a direction away from one another.

The pull tabs may be correlated in length and thickness to the size of a slot in the head of a hand tool used to remove an end plate from the end of a log. The pull tabs preferably are spaced slightly outwardly from the adjacent end face of the log. Such spacing is assured by having one or more discrete projections designated 18A, 19A, or ribs, on each of the respective tabs and these projections extend in a direction toward the end face of the log. The projections are made by a punching operation and thus appear as dimples on the face of the pull tabs seen in FIG. 1. Alternately the pull tabs may be formed have an arcuate longitudinal portion forming a slight longitudinal curve providing structural strength and whereby spreading of the crack in the log spreads the plate tending to straighten same and at the same time exerting lateral pressure on the pull tabs forcing them to grip tighter, bracing and locking them into the log. Another alternative is to provide the terminal end of a tab with an with an angle turned upwardly in a direction away from the surface 17, i.e. in a direction away from the adjacent end face of the log. Care however must be exercised so as to not straighten this bent when driving the spikes into the log. The plate should be driven end by hitting near its ends with the driving tool rather than string the plate in the center. As an alternative the tab ends maybe tapered in a direction away from the plate surface 16 (i.e. the log end face 21) to a thin free edge near the plane of the surface 17.

Figure 7:
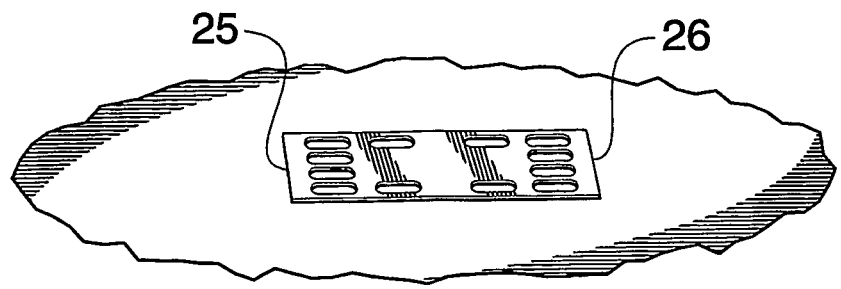
FIG. 7 is an oblique view of a spiked plate in the end of a log.

The log end plate shown in FIG. 7 is similar to a conventional connector plate but differs therefrom by being made of a heavier material and having means thereon to space the pull tabs a selected distance from the end face of the log. Such means may consist of one or more projections 18A, 19A (dimples, lugs or ribs) on or integral with the pull tabs and which project toward the end face of the log. The plate has portions struck outwardly therefrom providing spikes that project away from the face thereof as is conventional in plate connectors and therefore further description of the same is deemed unnecessary.

In FIGS. 3 to 6 and 8, 9 and 17 there is illustrated respective hand tools 30, 40 and 90 for removing a log end plate from the end of a log in preparation for sawing the log into pieces of timber or lumber. The tools of FIGS. 3-6, and 8-9 are functionally the same differing from one another only in constructional details. The tool, similar to the well known claw hammer, comprises a handle 31 having a head 32 attached to one end thereof. The head 32 has a curved outer face 33 that extends from a head heel terminal end 34 to the mouth 35 of a slot 36 adjacent the head toe impact outer end 37 opposite the handle. The slot 36 extends inwardly in a direction toward the handle and is of a selected corresponding depth and width that the pull tab slip fits therein. The heel terminal end 34 is relatively thin and forms a wedge that it can be readily forced between a pull tab and the adjacent end face of the log. This end of the tool comprising the wedge is used to pry the tab and bend it outwardly sufficiently so the tab can be positioned in the slot in the other end of the tool head.

Figure 8:
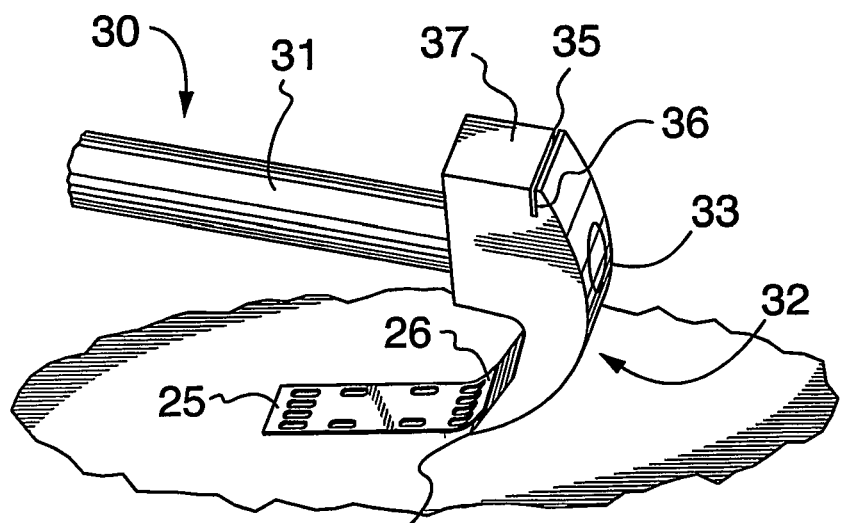
FIG. 8 is an oblique view illustrating a second embodiment of the hand tool and in a first position thereof to bend the lift tab for removing the plate.
Figure 9:
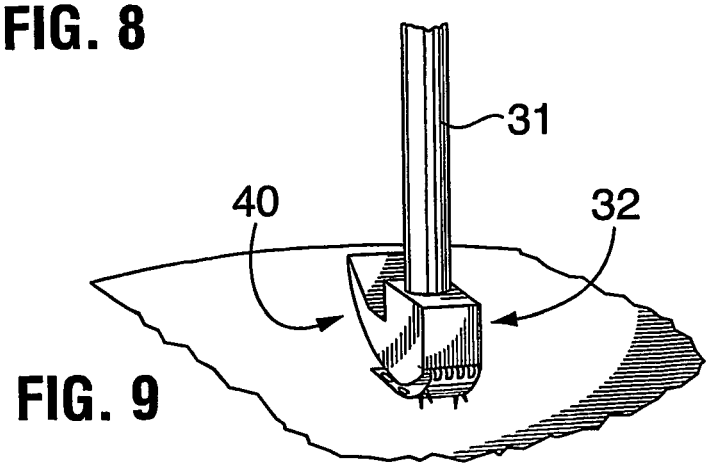
FIG. 9 is an oblique view similar to FIG. 8 but illustrating the hand tool in a second tab gripping position to remove the plate from the end of the log.
Figures 17, 18:
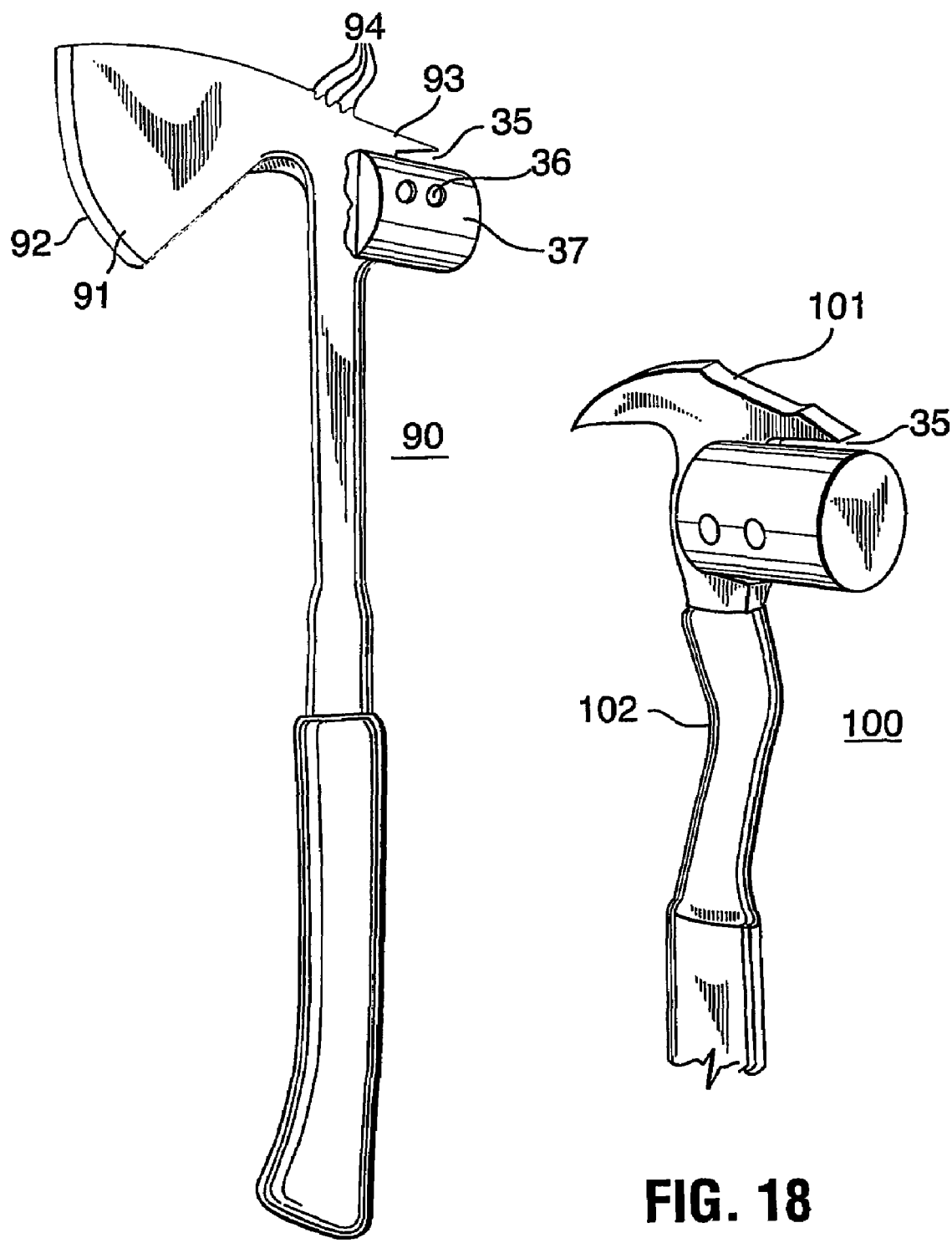
FIG. 17 is a perspective view showing an alternate embodiment of a hand tool including a hatchet on the opposing end of the have which includes a means for driving, a wedge for removing spiked plates and ribs for gripping the surface of the log.
FIG. 18 is perspective view showing another alternate embodiment of a hand tool including a hatchet on the opposing end of the have which includes a means for driving, a wedge for removing spiked plates and flat portion locking the wedge into the opening formed in the plate from stamping the pull tab for removing same from the surface of the log.

The hand tool shown in FIGS. 8 and 9 is a basic tool consisting of the handle and the head with a slot across the end of the head at the juncture of the outer end face thereof with commencement of the curved outer face at that toe end of the tool head. The slot has the entry mouth 35 offset from the plane of the outer end face that is used to hammer the spikes into the wood. This protects the relatively sharp edge, at the throat 35, which bites into the face of the lift tab when removing a plate from the end of a log. In the embodiments of FIGS. 17 and 18, the outer face of the tool head has a flat planar portion commencing at the mouth 35 of the slot 36 and extends a selected distance therefrom and the further portion of such face is curved forming a wedge whereby the junction of the curve with the flat planar portion forms a spur which tends to lock into an opening in the plate upon insertion into and extraction of same from a log.

Figure 3:
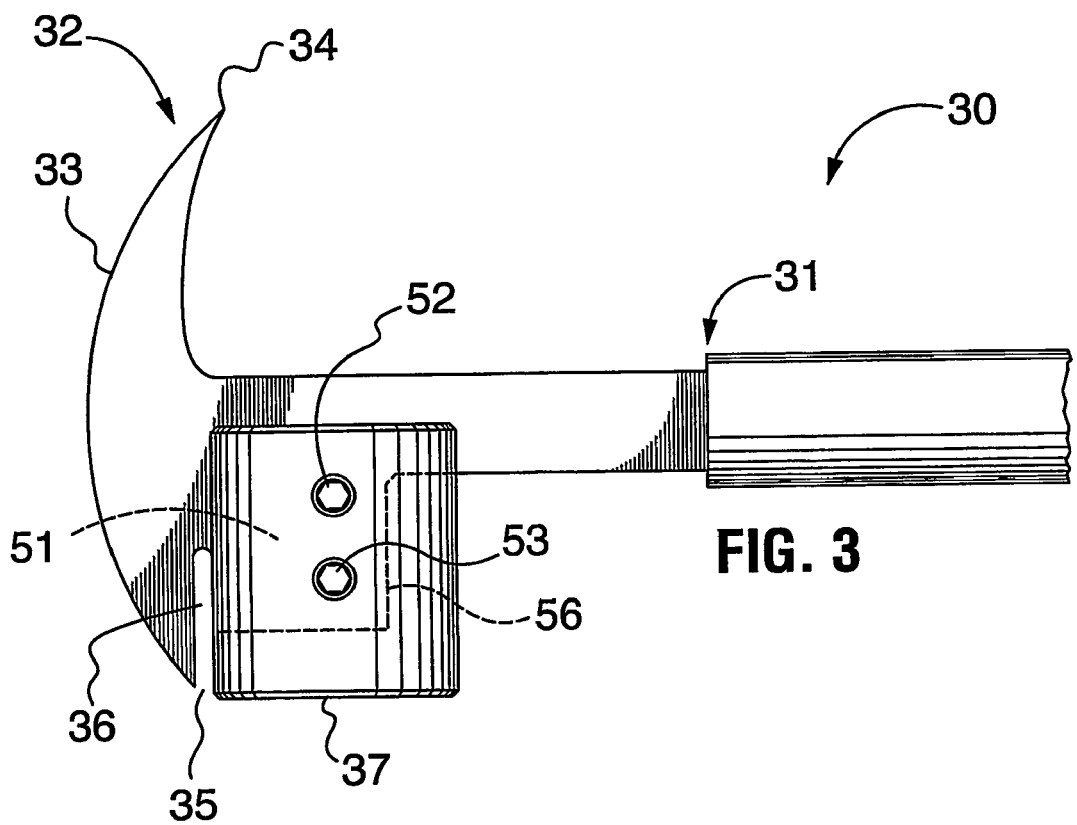
FIG. 3 is a side view of a hand tool provided in accordance with the present invention shown in position for driving an end plate into the end of the log and removing the same therefrom.
Figure 4:
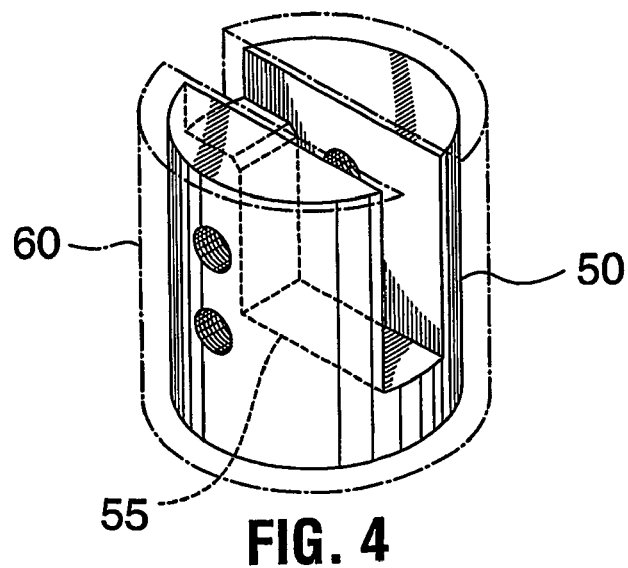
FIG. 4 is an oblique view of a replaceable head weight impact portion of the hand tool shown in FIG. 3.

The hand tool shown in FIGS. 3 to 6 has a removable part that provides the impact head portion of the tool. This permits varying the mass of the head without having to change the entire tool. It is also insert able into a protective and noise reducing covering. Of course it is contemplated that the impart head can be integrally formed with as a part of the tool head by molding or the like. Referring specifically to FIGS. 3 and 4 the impact end of the tool head comprises a plug 50 detachably secured to an enlargement 51 on the handle by a pair of pins 52 and 53. The pins maybe solid or a slit sleeve that can be driven in tight friction fit into aligned holes in the detachable insert or plug 50 and the handle enlargement 51. The removable head impact plug is shown in FIG. 4 in the form of a cylindrical member having a stepped recess 55 therein that receives the handle enlargement 51 and a portion of the handle as evident by the broken line.

The metal plug or insert 50 is encapsulated in a covering 60, or slip fit into a sleeve, of suitable high impact resistant plastics material such as polypropylene, nylon or the like.

Figure 5:
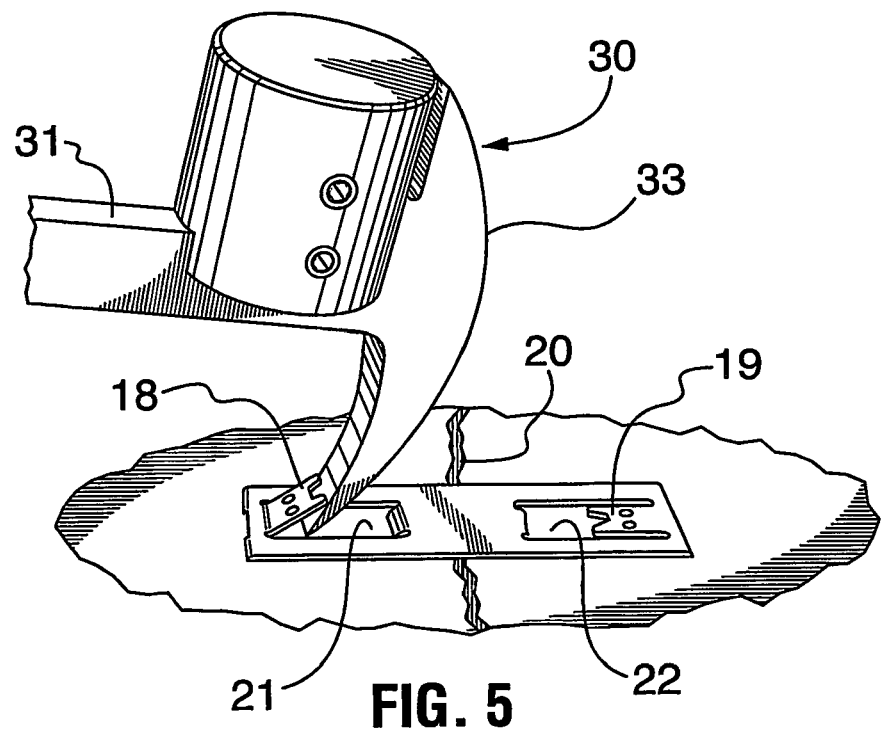
FIG. 5 is an oblique view of the end plate in a log and showing the hand tool of FIG. 3 in a first position for the initial step in removing the end plate.
Figure 6:
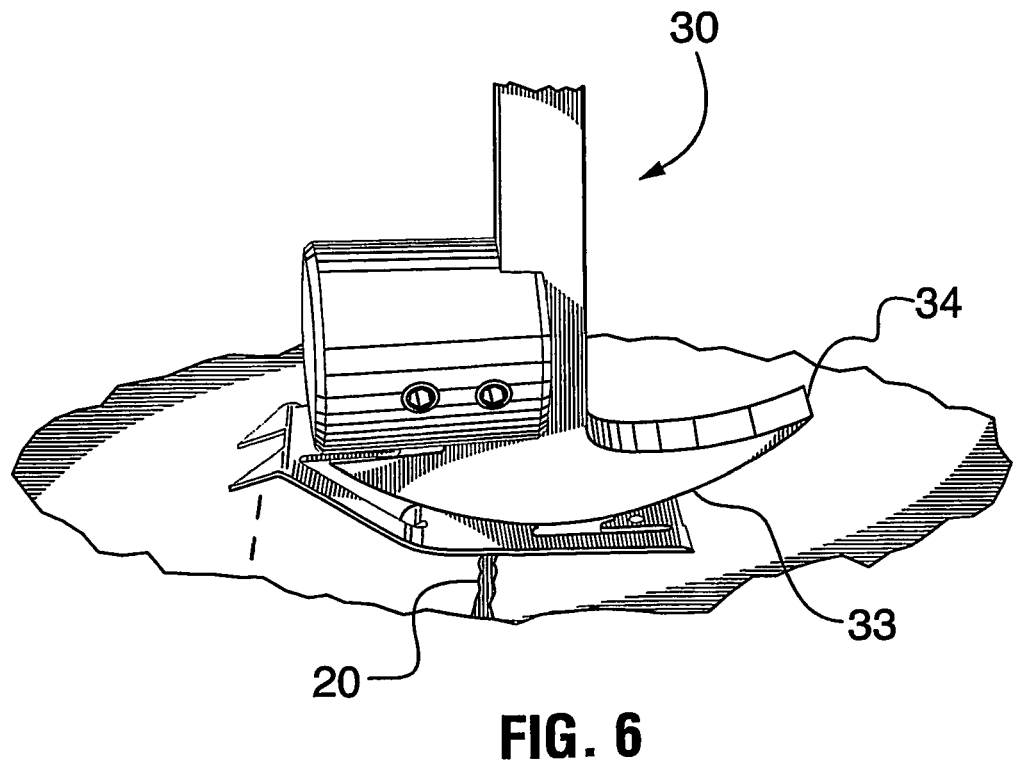
FIG. 6 is similar to FIG. 5 but illustrating the second tab gripping position of the tool for removing the plate from the end of the timber.

As previously mentioned the impact end of the hand tool is used to hammer the spikes of an end plate into the end of a log that has a crack, or indication of a crack forming therein. The opposite end of the tool is used to remove a plate from the end of a log. In so doing the first step is to bend a lift tab of the plate outwardly from the adjacent end of the log as illustrated in FIGS. 5 and 8. Next the tool is repositioned to place the bent outwardly tab in the slot 36 of the tool head. The handle end of the tool is then moved causing the outer face 33 to roll along the outer face of the end plate. This bends the plate sufficiently to pull the plate spikes from the log.

Figure 10:
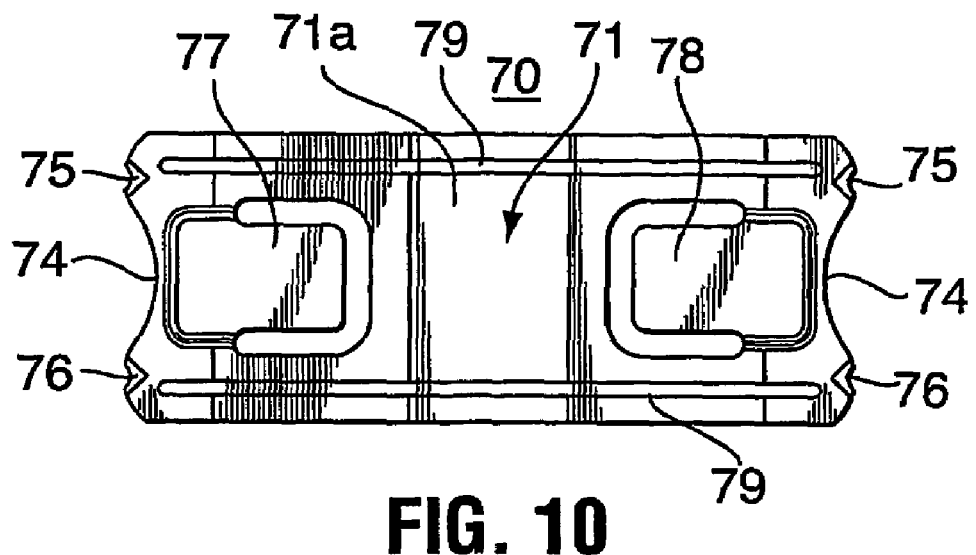
FIG. 10 is a top view illustrating another embodiment of a log end plate.
Figure 11:
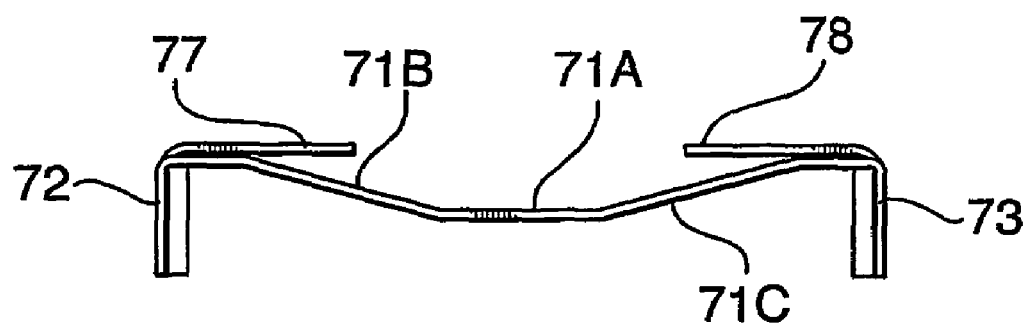
FIG. 11 is a side elevational view of the end plate shown in FIG. 10.

Referring to FIGS. 10 and 11 there is illustrated a log end plate 70 comprising a plate portion 71 having spikes 72 and 73 projecting therefrom at opposite ends thereof for impaling the end of a log. Each spike may have two or more points that impale the log or alternatively the impaling edge maybe a continuous longitudinal edge that is suitably sharpened to facilitate driving the spike into the end of the log. The end spikes are undulating in cross-section having a central concave portion 74 sandwiched between a pair of spaced apart outer convex sections 75 and 76. The plate portion 71 has a central flat portion 71A between respective end upwardly sloping portions 71B and 71C. Plate pull tabs 77 and 78 project into an open window area in the respective portions 71B and 71C. The plate portion 71 is reinforce by one or more elongate ribs, concave and/or convex formations 79. In this embodiment the spikes at the opposite ends are parallel to one another.

Figure 12:
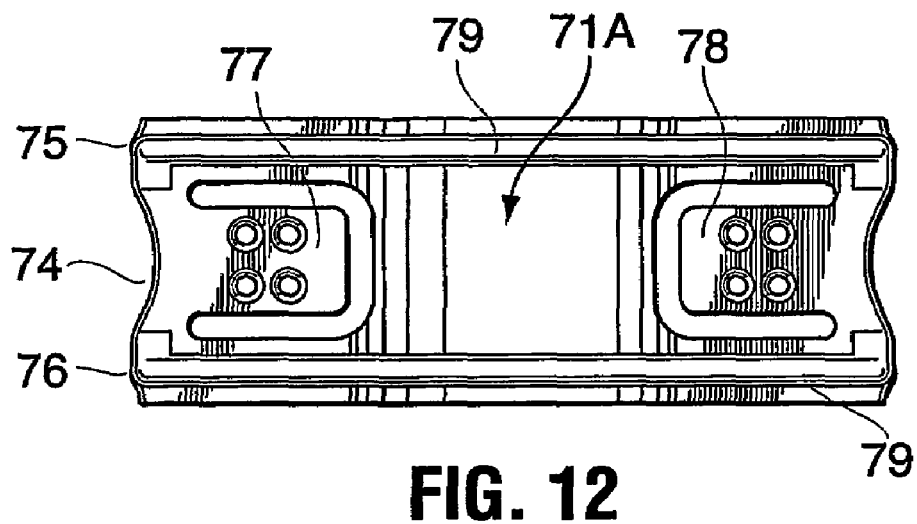
FIG. 12 is a top plan view of another embodiment of a log end plate.
Figure 13:
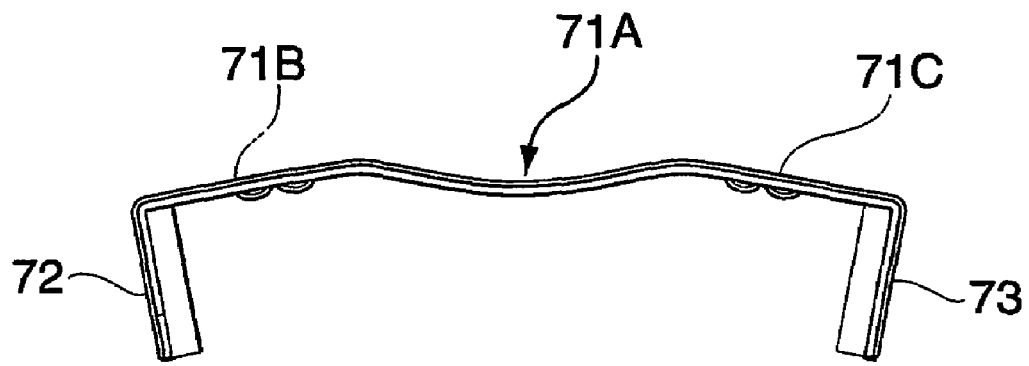
FIG. 13 is a side elevational view of the end plate shown in FIG. 12.

The log end plate illustrated in FIGS. 12 and 13 is similar to the one illustrated in FIGS. 10 and 11 differing therefrom firstly in the shape of the plate portion as viewed in the side view, (FIG. 11 vs FIG. 13), and secondly in the non parallel relation of the spikes. In this embodiment the spikes 72 and 73 slope toward one another in a direction away from the plate portion interconnecting the same.

Figure 14:
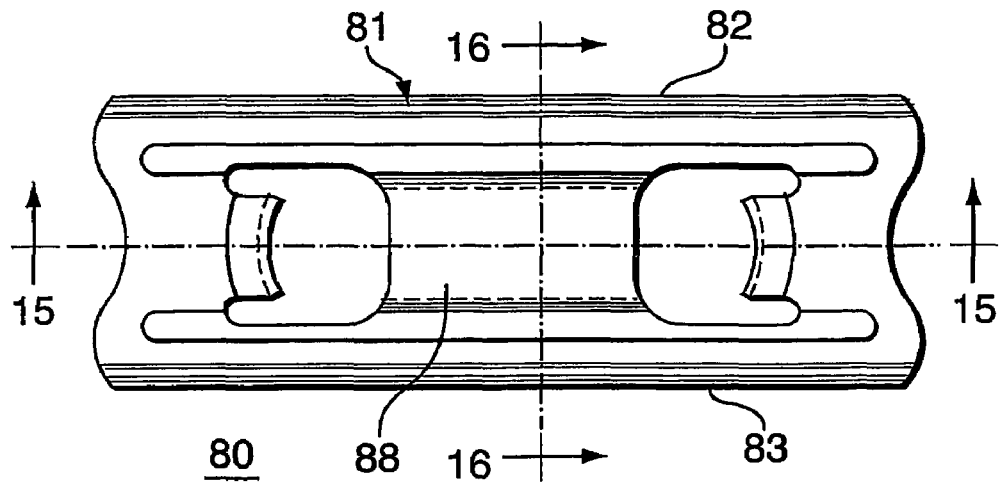
FIG. 14 is a top plan view illustrating a further embodiment of a log end plate.
Figure 15:
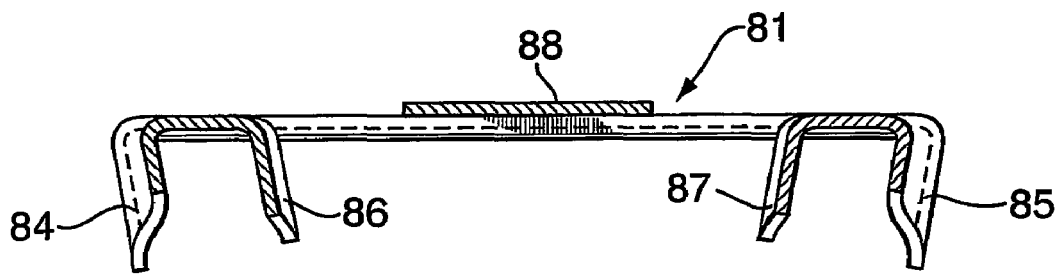
FIG. 15 is a longitudinal sectional view taken essentially along line 15-15 of FIG. 14.
Figure 16:
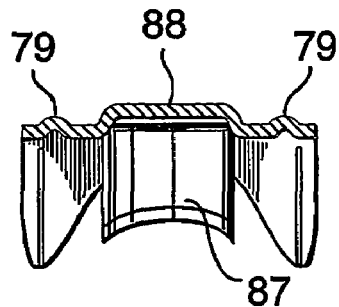
FIG. 16 is a transverse sectional view taken essentially along line 16-16 of FIG. 14.

Illustrated in FIGS. 14 to 16 is a log end plate 80 having a plate portion 81 with opposed longitudinal marginal edges 82 and 83 and terminating at opposite ends in respective undulating in cross-section web like spikes 84 and 85. A pair of spikes 86 and 87 are struck out of the plate portion 81 and project outwardly therefrom in the same general direction as the spikes 84 and 85. The spikes 86 and 87 are located between the spikes 84 and 85, and are spaced a selected distance therefrom. As in the embodiment of FIGS. 10-13 the plate portion 81 is reinforced by a pair of ribs 79 disposed parallel to the longitudinal edges 82 and 83.

FIGS. 17 and 18 illustrate some modifications of the hand tool. Referring to FIG. 17, illustrated is a hand tool 90 having a head impact portion 50 as illustrated in FIG. 3 with a slot 36 adjacent the impact face portion for the purposes as previously described. The tailpiece of the head however is modified to provide a blade 91 having a sharpened cutting edge 92 whereby the hand tool maybe used as a hatchet. Another modification concerns the outer curved face corresponding to the face designated 33 in FIG. 3. Instead of a continuously curved surface the face has a flat portion 93 commencing at the mouth 35 of the slot 36 and extends therefrom to a series of spaced apart ribs 94 that extend across the face of the tool. Also the impact face of the tool head maybe provided with a cap 95, of an impact resistant material, that maybe permanently attached or detachably attached as for example by a suitable adhesive.

Illustrated in FIG. 18, is a hand tool 100 in which the outer face of the head piece has a flat portion 101 corresponding to the flat portion 93 of FIG. 16. In this embodiment the handle has a curved neck portion 102 intermediate the head of the tool and the hand grip portion.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A plate comprising:
   a pair of oppositely disposed faces defining an outer face and an inner face;
   a plurality of spaced apart spikes project from said inner face, said spikes being grouped in pairs with at least one spike in each of said pairs is spaced an equal distance from a centerline of said inner face at each corner as compared to the other spike of said pair, and wherein each one of said spikes in each of said pairs are canted slightly toward each other in opposition to one another; and
   at least one pair of plate tabs integral with said plate and of selected length extend spaced apart from one another longitudinally from an end toward a center portion of said outer face, a portion of each of said tabs being bent at an angle toward said inner face forming a pair of interior spikes and an open window on each side of a generally central flat portion exposed for locking engagement with a tool disposed adjacent the outer face of said plate.

2. The spiked plate as defined in claim 1 wherein said pair of tabs extend in a direction toward one another whereby free terminal outer ends associated with the respective tabs face one another.

3. The spiked plate as defined in claim 1 wherein said pair of tabs extend in a direction away from one another whereby terminal free outer ends associated with the respective tabs face in a direction away from one another.

4. The spiked plate as defined in claim 1 including means on each said plate pull tab that projects therefrom in a direction corresponding to that of said spikes and thereby spacing the respective pull tabs a selected distance from the surface of an object impaled by said spikes.

5. Spiked plate as defined in claim 1 wherein said tabs and plate are coplanar and said pull tabs project into the window associated therewith.

6. The spiked plate of claim 5, wherein said tabs are smaller than said window.

7. The spiked plate of claim 1, including at least elongate rib for reinforcing said plate.

8. The spiked plate of claim 1, wherein said outer face is slightly convex and said inner face is slightly concave from end to end.

9. The spiked plate of claim 7, wherein said spiked plate includes a least one elongate rib extending along each side edge of said spiked plate.

10. The spiked plate of claim 1, wherein said inner face is slightly concave from side to side and side outer face is convex from side to side.

11. The spiked plate of claim 1, wherein said spiked plate includes a least one elongate rib extending along each side edge of said spiked plate, said outer face is slightly convex and said inner face is slightly concave from end to end, and said inner face is slightly concave from side to side and side outer face is convex from side to side.

12. The spiked plate of claim 1, wherein a distal end of said tabs comprises a concave shaped cross section defining a pair of points.

13. The spiked plate of claim 1, wherein each spike defines a continuous longitudinal edge sharped to facilitate driving the spike into the end of a log.

14. The spiked plate of claim 1, wherein said end spikes are undulating in cross-section having a central concave portion sandwiched between a pair of spaced apart outer convex sections.

15. A plate for arresting continuation of a split in a log wherein the split appears as a crack in an end face of said log, said plate consisting essentially of:
   a pair of oppositely disposed faces defining an outer face and an inner face;
   a spaced apart spike projecting from each corner of said inner face, said spikes being grouped in pairs with at least one spike in each of said pairs spaced an equal distance from a centerline of said inner face at each corner as compared to the other spike of said pair, and wherein each one of said spikes in each of said pairs are canted slightly toward each other in opposition to one another; and at least one plate tab integral with said plate and of selected length extending longitudinally from an end toward a center portion of said outer face, a portion of said at least one tab bending inwardly at an angle forming an interior spike and an open window between a generally flat portion exposed for locking engagement with a removal tool.

16. The spiked plate of claim 15, including at least elongate rib for reinforcing said plate.

17. The spiked plate of claim 15, wherein said outer face is slightly convex and said inner face is slightly concave from end to end.

18. The spiked plate of claim 15, wherein said spiked plate includes a least one elongate rib extending along each side edge of said spiked plate.

19. The spiked plate of claim 15, wherein said inner face is slightly concave from side to side and side outer face is convex from side to side.

20. The spiked plate of claim 15, wherein said spiked plate includes a least one elongate rib extending along each side edge of said spiked plate, said outer face is slightly convex and said inner face is slightly concave from end to end, and said inner face is slightly concave from side to side and side outer face is convex from side to side.

21. The spiked plate of claim 15, wherein a distal end of said pull tab comprises a concave shaped cross section defining a pair of points.

22. The spiked plate of claim 15, wherein each spike defines a continuous longitudinal edge sharped to facilitate driving the spike into the end of a log.

23. The spiked plate of claim 15, wherein said end spikes are undulating in cross-section having a central concave portion sandwiched between a pair of spaced apart outer convex sections.

24. A plate for arresting continuation of a split in a log wherein the split appears as a crack in an end face of such log, said plate consisting of:

a log including at least one crack appearing in an end face of said log;

a strip of material having a pair of oppositely disposed faces defining an inner face and an outer face;

said distal ends of said strip defining a continuous longitudinal edge having a central concave portion disposed between a pair of spaced apart outer convex sections defining spaced apart distal end spikes;

said distal end spikes bending downward with respect to said inner face;

said strip of material including at least one opening disposed between a central flat portion and said distal end formed by cutting through a portion of said strip of material forming a tab, a portion of said tab bending downward with respect to said inner face defining a spike projecting between said distal end spikes;

said central flat portion defining at least one tab disposed on said outer face operably engageable by a tool for removal of said plate from said log.

* * * * *